United States Patent [19]

Wichoud

[11] 4,384,834
[45] May 24, 1983

[54] DEVICE FOR COMPACTING POWDER

[75] Inventor: Michel Wichoud, Yens, Switzerland

[73] Assignee: Institut Cerac S.A., Ecublens, Switzerland

[21] Appl. No.: 231,615

[22] Filed: Feb. 5, 1981

[30] Foreign Application Priority Data

Feb. 13, 1980 [SE] Sweden ................................ 8001120

[51] Int. Cl.³ .............................................. B29C 1/00
[52] U.S. Cl. .......................................... 425/1; 264/84; 425/355
[58] Field of Search ................ 249/112; 425/354, 355, 425/1; 264/84

[56] References Cited

U.S. PATENT DOCUMENTS 2,267,508 12/1941 Spengler ........................... 425/355 X
2,942,298 6/1960 Loedding ............................ 425/354

Primary Examiner—Thomas P. Pavelko
Attorney, Agent, or Firm—Eric Y. Munson

[57] ABSTRACT

A compaction device for compacting powder in which a compaction chamber (16) is formed by a block (1) having a conical bore (9) and a conical sleeve (2) being movable in the bore to be compressed thereby. The taper of sleeve (2) is somewhat smaller than that of the bore (9). A combined shock absorber and extractor, for the compacted powder, which comprises a movable support (4) extending into the compaction chambers (16) and being provided with an enlarged head portion (13) having passages (14). An accumulator (42) is connected to a chamber (22) of the cylinder (11) in which support (4) is movable. The accumulator (42) improves the shock absorbing characteristics.

5 Claims, 3 Drawing Figures

DEVICE FOR COMPACTING POWDER

The present invention relates to a device fo compacting powder comprising interweldable particles into a solid body.

In prior art compaction devices it has been a problem to obtain accurate calibration of the dimensions of the compaction chamber as well as extraction of the compact without risk of breakage of the compact. One way of decreasing the risk of breakage is shown in British Pat. No. 1 358 665 according to which the compaction chamber is formed by a thin cylindrical sleeve whose diameter is calibrated by the application of an external gas pressure. After compaction the gas pressure is decreased and the compact taken out. In order to obtain accurate calibration of the diameter the gas pressure must be accurately controlled.

According to one aspect of the invention a compaction device is created having a compaction chamber formed by a block comprising a conical bore and a conical sleeve being movable into the bore. A compaction device made in this way makes it possible for the sleeve to be expanded after the compaction by movement in the opposite direction. The compact is then easily pushed out without risk of breakage. A compaction device made in this way is also capable of standing the very high pressures obtained during dynamic compaction. It is particularly advantageous to make the sleeve with a somewhat smaller taper than that of the conical bore so that a lubricant, necessary for the movement of the sleeve, introduced around the smaller end of the sleeve is squeezed out between the sleeve and the block when the sleeve is pushed into the conical bore. In this way good lubrication is obtained without the introduction of any unnecessary stress concentrators, as would result from machining in oilways.

According to another aspect of the invention a compaction device is created having a combined shock absorber and extractor for the compact. This shock absorber comprises a movable support extending into the compaction chamber. The support comprises a shaft portion and an enlarged head portion which is movable in a fluid-filled cylinder. The head portion is provided with passages to allow fluid to pass from one side of the head portion to the other. Furthermore, there is a piston being freely movable in the cylinder along the shaft portion to form a seal therebetween. According to an advantageous embodiment of the invention an accumulator is connected to the cylinder at the end being directed away from the compaction chamber. In this way a part of the shock is taken up by the accumulator which then will return the support at a low speed.

An embodiment of the invention is described below with reference to the accompanying drawings in which FIG. 1 illustrates the lower part of a compaction device incorporating the present invention.

Figure 1:
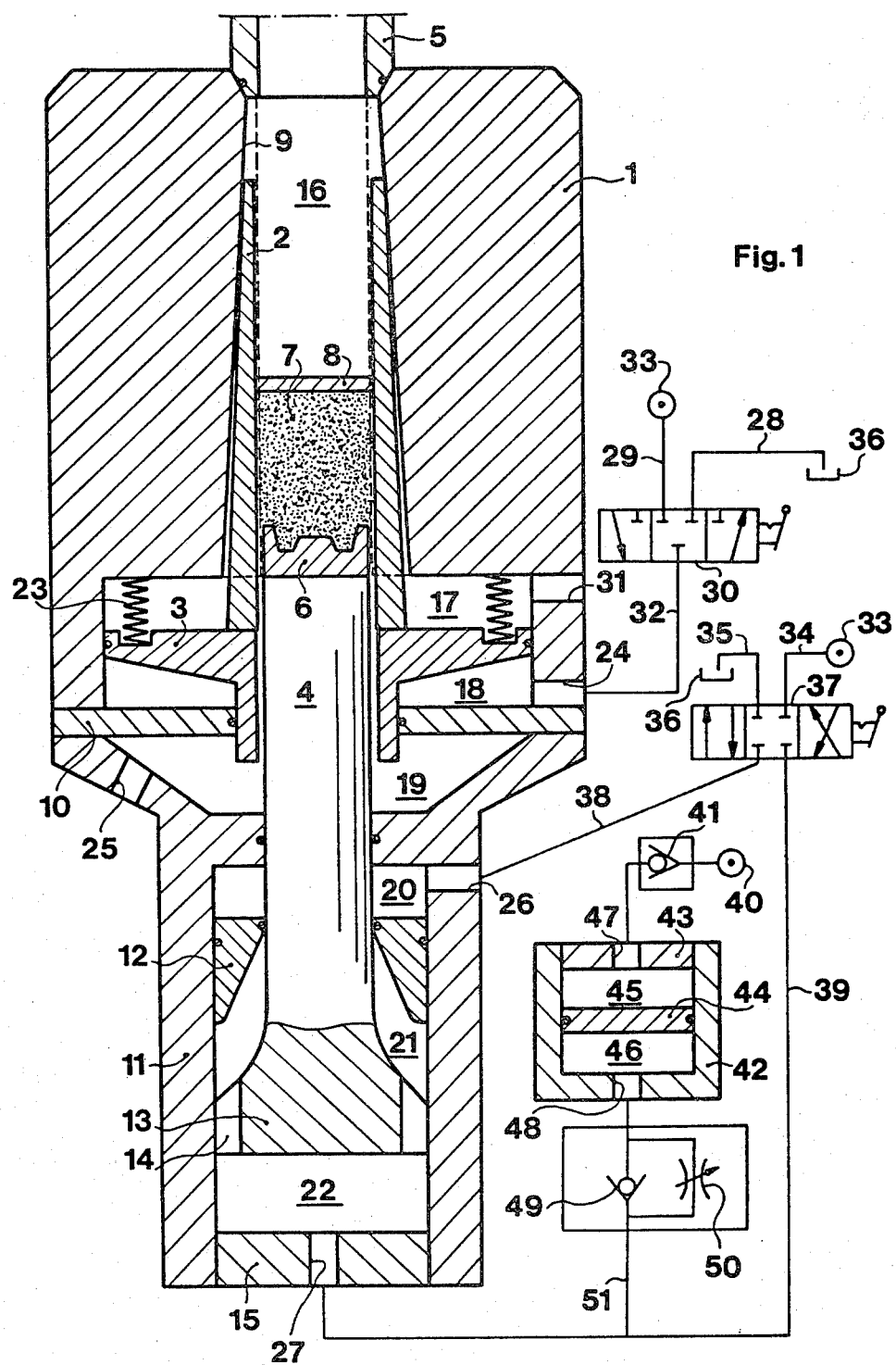

The compaction device shown in the drawings comprises a block 1 provided with a conical bore 9. The block is capable of standing very high internal pressures. A conical sleeve 2 is axially movable in the bore 9 by means of a piston 3 to which the sleeve is secured. Sleeve 2 has a somewhat smaller taper than the conical bore 9. As an example the actual size of the slot around the sleeve could at the lower end be about 0.01 mm when the upper end contacts the block and the diameter of compaction chamber 16 is 70 mm. A lubricant introduced between the sleeve and the block at the upper end will be squeezed out over substantially the entire surface of the sleeve when the sleeve is pushed into the block. This movement will reduce the diameter of the compaction chamber with about 0.4 mm. A plate 10 and a cylinder 11 are fixed to the block 1. Cylinder 11, whose cavities 20, 21 and 22 are filled with hydraulic fluid, is provided with a bottom plate 15. Piston 3 is moved upwards by supplying hydraulic fluid to chamber 18 and downwards by springs 23 when the pressure is released. The chamber 18 is connected to a control valve 30 via a conduit 32 and an opening 24. Hydraulic fluid is supplied from a hydraulic pressure source 33 via conduit 29 to valve 30. By supplying hydraulic fluid to chamber 18 the conical sleeve 2 can be precisely positioned to accurately calibrate the diameter of compaction chamber 16. Chamber 17 is through a hole 31 connected (not shown) to a sump 36.

The device is furthermore provided with a movable support 4 extending into the compaction chamber 16. A die 6 is placed on the support and a powder or powder mixture 7 is placed on the die. The powder is then covered by a thin cover 8. The device is provided with a chamber 19 to allow piston 3 to move. Chamber 19 is connected (not shown) to the sump 36 through one or more holes 25. The movable support comprises a shaft portion 4 and a head portion 13 having a larger cross-sectional area than the shaft portion. The head portion 13 is provided with a number of slots or passages 14 to allow fluid to pass from one side of the head portion to the other. The total area of these passages is calibrated so as to give a predetermined flow resistance when the support is used as shock absorber. An annular piston 12 is freely movable along shaft portion 4 to form a seal between cavities 20 and 21. Because of piston 12, support 4 can be used to position die 6 in a suitable position in compaction chamber 16 and to extract the compact after compaction. Cylinder 11 is for this purpose in practice much longer than shown. Support 4 is positioned by supply of hydraulic fluid to either cavity 20 or cavity 22 via conduits 38, 39 and openings 26, 27. Movement of support 4 is controlled by control valve 37, which is shown in its neutral position. This position is used during compaction and the valve must, therefore, in this position, be capable of standing quite high pressures. Valve 37 is via a conduit 34 connected to the hydraulic pressure source 33 and via a conduit 35 to sump 36. The device is furthermore provided with an accumulator comprising a container 42 having a top plate 43 and a freely movable piston 44. The accumulator comprises two chambers 45, 46 of which chamber 45 is filled with compressed air and chamber 46 with hydraulic fluid. The accumulator is provided with an opening 48 through which it is connected to conduit 39 via a conduit 51 and a check valve 49 which is bypassed by a variable restriction 50. Chamber 45 is via an opening 47 and a check valve 41 connected to a compressed air source 40.

Figures 2, 3:
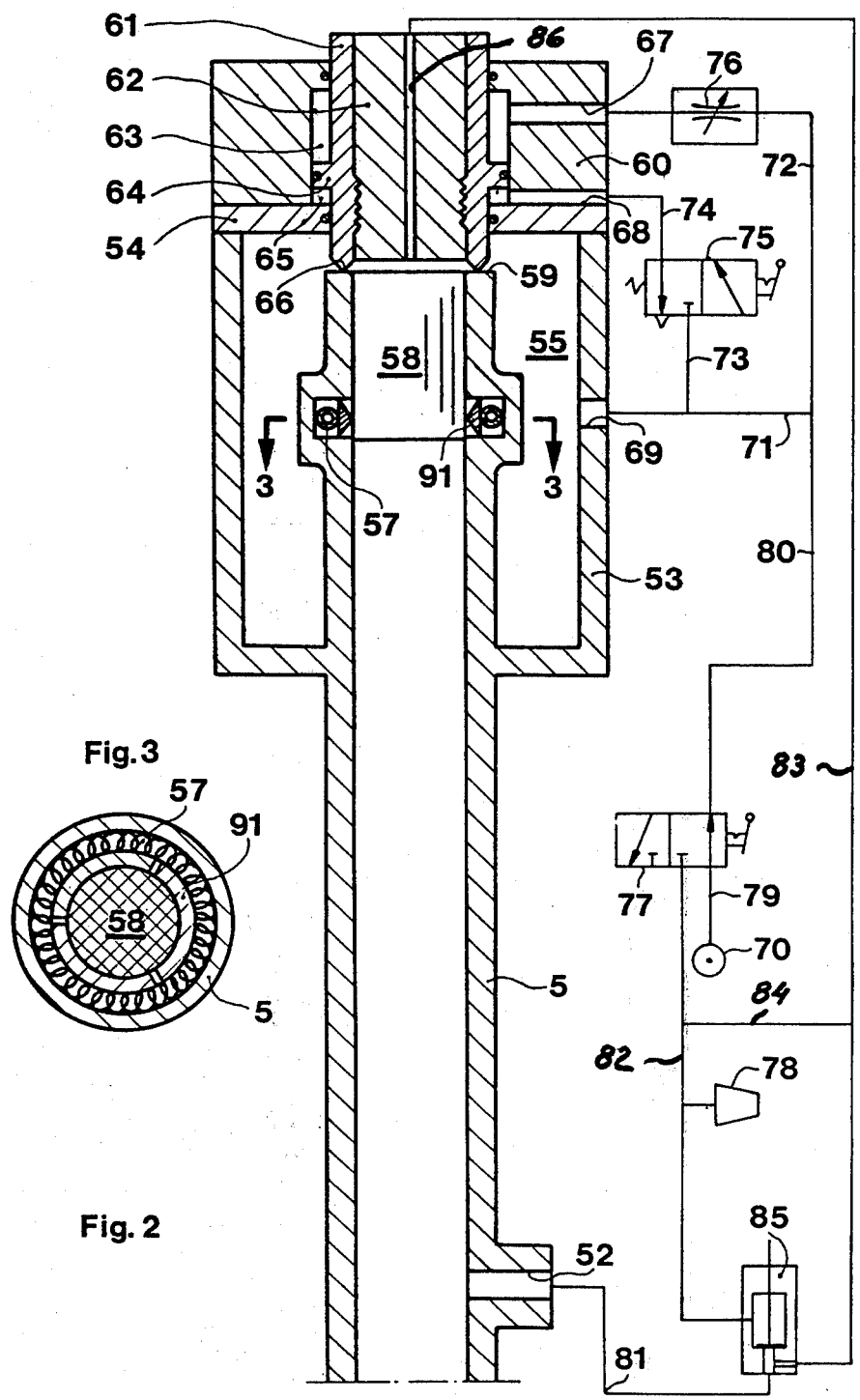
FIG. 2 illustrates the upper part of the device.
FIG. 3 shows a section according to 3—3 in FIG. 2.

The upper part of the compaction device comprises a barrel 5 through which a punch 58 is launched to compact the powder 7 in the compaction chamber 16. Punch 58 is held in the position shown in the drawing by a spring 57 and a ring 91 comprising three parts. The barrel is provided with shell 53 to which a plate 54 and a top piece 60 are fixed. A pressure gas container 55 is defined by barrel 5, shell 53, plate 54 and a valve body 61. The valve body is provided with a flange 64 being movable in a control chamber 63, 65 and an end portion 66 which has a reduced diameter for cooperation with an end surface 59 of the barrel 5. Valve body 61 could be provided with a core 62 of aluminum or plastics to make the valve body lighter. Top piece 60 is provided with channels 67, 68 to allow supply of compressed air to chambers 63, 65. Channel 67 is connected to chamber 63 a short distance from the upper end so that a cushion is created to prevent flange 64 from hitting top piece 60. Channel 67 is via a variable restriction 76 and conduits 72, 80 connected to a conical valve 77. Channel 68 is via a conduit 74, a control valve 75 and conduits 73, 71, 80 connected to control valve 77. The pressure gas container 55 is via an opening 69 and conduits 71, 80 connected to control valve 77. Barrel 5 is via an opening 52 and conduit 81 connected to blowout valve 85. Control valve 77 is via a conduit 79 connected to compressed air source 70 and via a conduit 82 to a vacuum pump 78 and blowout valve 85. Blowout valve 85 is furthermore through conduits 83, 84 and 82 connected to vacuum pump 78. The space between valve body 61 and punch 58 is evacuated by vacuum pump 78 through channel 86 and conduits 83, 84 and 82 to avoid accidental firing because of leakage from gas containing 55. Blowout valve 85 allows driving gas to escape from barrel 5 when punch 58 has passed opening 52 and prevents overloading of vacuum pump 78. Instead of compressed air source 70 could deliver any compressed gas, e.g. helium or an explosive gas mixture. In the following the operation of the shown compaction device is described. The starting point is that a compaction has been completed. The movable support 4 is lowered to the shown position by operation of valve 37 so that hydraulic fluid is supplied to cavity 20. In this way piston 12 is pushed downwards into contact with head portion 13, thereby moving support 4. The wall of compaction chamber 16 is now cleaned to make it ready for the next compaction. A die 6 is placed on the support and the powder 7 is introduced into compaction chamber 16. A thin cover 8 or another die is placed on the powder. If desired for the particular application the powder is precompacted to a predetermined density by pressing with some suitable, not shown, means. After this the punch 58 is entered at the lower end of barrel 5 and moved up to the top of the barrel by the use of a telescopic actuator, not shown. A lubricant is introduced between the upper end of the conical sleeve 2 and block 1. Valve 30 is now operated to supply hydraulic fluid to chamber 18 to push sleeve 2 to the shown position and further into the conical bore 9. Sleeve 2 is hereby compressed radially to calibrate the diameter of compaction chamber 16. At the same time the lubricant is squeezed out between sleeve 2 and block 1. After this support 4 is pushed upwards a little by operation of valve 37 to put the powder in a more central position in compaction chamber 16. The upper part of the compaction device is now moved in over the compaction chamber and lowered so that barrel 5 comes into cooperation with block 1 as shown in FIG. 1. With the barrel in this position valve 77 is moved to the position shown in FIG. 2. Barrel 5 and compaction chamber 16 are now evacuated by pump 78 to a low pressure, e.g. 0.01 bar. At the same time compressed air is supplied from compressed air source 70 to pressure gas container 55 and chamber 63. Punch 58 is held in the shown position by spring 57. At this stage punch 58 is launched against the powder 7 by moving valve 75 to the position opposite to that shown in FIG. 2. In this way compressed air is supplied to chamber 65 to balance the pressure in chamber 63. Valve body 61 is moved upwards because its end portion 66 has a reduced diameter. A communication is thus created between pressure gas container 55 and the space between projectile 58 and valve body 61. Compressed air is now applied to the entire cross-sectional area of the valve body which is rapidly thrown upwards so that a full capacity flow communication is obtained between pressure gas container 55 and barrel 5. After the compaction the upper part of the compaction device is lifted and moved aside. Conical sleeve 2 is now lowered by releasing the pressure in chamber 18. Sleeve 2 expands. The solid body produced is then extracted by means of the movable support 4 which is moved upwards by operation of valve 37.

The shock wave created when projectile 58 impacts cover 8 in compaction chamber 16 is propagated through the powder 7 to compact it into a solid body and taken up by the shock absorber in order to ensure that the compact is not broken. During compaction valve 37 is in the position shown in FIG. 1. The energy of the shock wave is taken up by the movable support 4 and is partly transformed into heat because of flow losses in passages 14 in the head portion 13 and in the conduits between cavity 22 and chamber 46 of the accumulator and partly stored in the accumulator. With this shock absorber it is possible to take up the kinetic energy of the shock wave in such a way that no harmful repercussions are obtained.

The above described and in the drawings shown embodiment is only to be regarded as an example which may be modified within the scope of the subsequent claims. For instance, sleeve 2 may be tapered in the opposite sense. Furthermore, a second, preferably cylindric, sleeve may be placed within the conical sleeve.

I claim:

1. A device for compacting powder into a solid body, said device comprising a compaction chamber (16) for the powder (7), a movable support (4) extending into said compaction chamber to support the powder therein, and means (5) for launching a punch (58) against the powder to form said solid body, characterized in that said compaction chamber (16) is formed by a block (1) having a conical bore (9) defined therein, and a conical sleeve (2) having a continuous uncut sidewall being movable in said conical bore to be radially compressed thereby.

2. A device according to claim 1, characterized thereby that said conical sleeve (2) has a taper which is somewhat smaller than the taper of said conical bore (9).

3. A device for compacting powder into a solid body, said device comprising a compaction chamber (16) for the powder (7), a movable support (4) extending into said compaction chamber to support the powder therein, and means (5) for launching a punch (58) against the powder to form said solid body, characterized thereby that said movable support comprises a shaft portion (4) extending into the compaction chamber (16) and a head portion (13) having a larger cross-sectional area than the shaft portion, said head portion being movable in a cylinder (11) containing fluid, said head portion being provided with passages (14) to allow fluid to pass from one side of the head portion to the other, and that a piston (12) is movable in said cylinder along said shaft portion to form a seal therebetween, whereby said movable support is capable of performing both as a shock absorber and an extractor for the solid body.

4. A device according to claim 3, characterized thereby that an accumulator (42) is connected to said cylinder (11) at the end being directed away from the compaction chamber (16).

5. A device according to claims 1 or 3, characterized thereby that said means for launching a punch (58) comprises a barrel (5) extending between said compaction chamber (16) and a pressure gas container (55), and a valve body (61) being movable in the direction of the barrel to control fluid communication between said container and the barrel, said valve body being provided with a flange (64) which is movable in a control chamber (63,65), and an end portion (66) with reduced diameter for cooperation with an end surface (59) of the barrel.

* * * * *